United States Patent Office 3,577,376
Patented May 4, 1971

3,577,376
INTERPOLYMERIZATION OF ACRYLAMIDE, VINYL ACETATE AND OTHER MONOMERS BY USING A SOLUBILIZING AGENT TO DISSOLVE THE ACRYLAMIDE IN THE VINYL ACETATE
Raymond Lanthier, Pierrefonds, Quebec, and Lorenzo Ouellet, Dorion, Quebec, Canada, assignors to Gulf Oil Canada Limited, Toronto, Ontario, Canada
No Drawing. Continuation-in-part of application Ser. No. 688,348, Dec. 6, 1967. This application Oct. 24, 1968, Ser. No. 770,441
Int. Cl. C08f 1/08, 15/16
U.S. Cl. 260—29.6     11 Claims

ABSTRACT OF THE DISCLOSURE

Process for aqueous emulsion interpolymerization of vinyl acetate and acrylamide with or without additional monomers in proportions to form stable 50–70% interpolymer solids emulsions, with 2–15% acrylamide by weight of the other monomers in the interpolymer, by dissolving the acrylamide in the vinyl acetate with the aid of a solubilizing agent before dispersing the monomers in an aqueous medium for interpolymerization. Examples of suitable specific solubilizing agents are methanol and formamide, materials which render acrylamide soluble in vinyl acetate and do not interfere with subsequent interpolymerization nor adversely affect the properties of the resulting interpolymer emulsion.

RELATED APPLICATION

This application is a continuation-in-part of co-pending application Ser. No. 688,348, filed Dec. 6, 1967 and now abandoned.

This invention relates to stable aqueous dispersions or emulsions of vinyl acetate-acrylamide interpolymers and an improved process for the preparation thereof, and more particularly to an improved process for the preparation of the type of random vinyl acetate-acrylamide copolymer emulsions initially disclosed in U.S. Pat. 3,365,-409 of Raymond Lanthier.

Copolymers of vinyl acetate and acrylamide containing up to 15% of acrylamide, by weight of the vinyl acetate in the copolymer, are not water soluble, although they have hydrophilic properties increasing as the proportion of acrylamide in the copolymer increases. Such copolymers in the form of aqueous dispersions are of particular interest in the field of adhesives and coatings for wood, where the presence of the amide groups in the copolymer gives it properties superior to those of vinyl acetate homopolymers. Copolymers of vinyl acetate and acrylamide containing over about 15% acrylamide by weight of the vinyl acetate are expected to be so hydrophilic in nature that it is not possible to make aqueous dispersions of the solid copolymers.

In U.S. Pat. 3,365,409 there is disclosed a process for copolymerizing vinyl acetate and acrylamide in aqueous medium to produce a dispersion or emulsion of random copolymer of the vinyl acetate and acrylamide, which copolymer contains from 6% to 15% acrylamide by weight of the vinyl acetate and is characterized by complete solubility in a 75/25 w./w. mixture of acetone and water. The process therein disclosed involves the delayed addition of an aqueous solution of at least 75% of the acrylamide to the copolymerization reaction. Certain difficulties are found to occur in obtaining a product of uniform emulsion viscosity when carrying out the aforesaid process, and the difficulties appear to involve the premature homopolymerization of the acrylamide in aqueous solution.

It is now found that the addition of the acrylamide monomer to the copolymerization reaction can be uniformly achieved without dissolving the acrylamide in water. Uniform addition of the acrylamide to the polymerization mixture can be achieved by dissolving the acrylamide in another medium in which the acrylamide is not prone to polymerize prematurely, i.e. homopolymerize. A simple expedient would be to dissolve the acrylamide in the monomeric vinyl acetate, which is added to the polymerization mixture during the reaction, but acrylamide is soluble in vinyl acetate only to the extent of about 2% by weight at room temperature, and emulsions containing more than 2%, that is from 2% to 15% of acrylamide by weight of the vinyl acetate in the copolymer, are required. It has been found that acrylamide can be dissolved to the necessary extent for purposes of this invention in vinyl acetate containing a solubilizing agent effective to make vinyl acetate solvent for the acrylamide. The present invention thus applies to the emulsion copolymerization of vinyl acetate and acrylamide in which the proportion of acrcylamide in the copolymer is in the range from 2% to 15% by weight of the vinyl acetate. The invention is, however, applicable not only to the copolymerization of vinyl acetate with acrylamide but also to the preparation of interpolymers of vinyl acetate and acrylamide with other ethylenically unsaturated monomers. Emulsions of such interpolymers, wherein vinyl acetate is the major component of the interpolymer and acrylamide is present in a proportion of about 2% to 15% by weight of other components, are also of interest in the field of coatings and adhesives for wood. In an emulsion interpolymerization process the invention serves the same purpose as in the emulsion copolymerization of only vinyl acetate with acrylamide. That is, it provides a means of uniform addition of acrylamide monomer to the emulsion polymerization reaction without using an aqueous feed solution thereof.

Thus, if desired for modification purposes, one or more additional monomers may be substituted for a part of the vinyl acetate to be polymerized with the acrylamide. Examples of additional monomers are alkyl esters of acrylic acid, e.g. n-butyl acrylate and 2-ethylhexyl acrylate, alkyl maleates and fumarates, homologues of vinyl acetate e.g. vinyl propionate, vinyl butyrate, and a vinyl decanoate sold as VV–10 (trademark).

The invention thus consists of the improvement in a process for preparing an aqueous emulsion of a random interpolymer from monomers comprising vinyl acetate and acrylamide, said interpolymer containing a major proportion of vinyl acetate and from 2% to 15% of acrylamide by weight of monomers other than acrylamide, by emulsion polymerization of the monomers in aqueous medium in proportions to provide an interpolymer emulsion of from 50% to 70% solids, which improvement comprises dissolving the acrylamide monomer in a mixture of the vinyl acetate monomer and a solubilizing agent which is effective to make the vinyl acetate a solvent for the acrylamide, dispersing the monomers into an aqueous polymerization medium and interpolymerizing the monomers therein to form an aqueous interpolymer emulsion.

In a specific embodiment the invention consists in a process for preparing an aqueous emulsion of a random copolymer of vinyl acetate and acrylamide, which copolymer contains from 2% to 15% of acrylamide by weight of the vinyl acetate, said process comprising:

(1) establishing an initial aqueous polymerization medium containing:
   (a) a major proportion of the water for the aqueous emulsion being prepared,
   (b) a proportion from 0% to 25% of the total amount of acrylamide to be copolymerized, said total amount being from 2% to 15% by weight of the vinyl acetate to be copolymerized, said proportion of acrylamide being dissolved in
   (c) a part amounting to less than 10% of the total amount of vinyl acetate to be copolymerized, said vinyl acetate containing dissolved therein a proportion of an organic hydroperoxide initiator of a redox polymerization catalyst system and a solubilizing agent effective to make the vinyl acetate for the acrylamide, and
   (d) an amount, from 0% to 1% by weight of the vinyl acetate to be polymerized, of an emulsifying agent effective to emulsify the vinyl acetate in the aqueous medium, (2) while maintaining the aqueous polymerization medium continuously agitated and at a temperature at least 10° C. below the reflux temperature thereof, and preferably in the range of 40–45° C., slowly adding to the aqueous medium to form a polymerization mixture:
   (a) the remainder of the vinyl acetate to be copolymerized said vinyl acetate containing:
      (i) an additional proportion of said organic hydroperoxide initiator,
      (ii) the remainder of the acrylamide to be copolymerized, and
      (iii) a solubilizing agent effective to make the vinyl acetate a solvent for the said remainder of the acrylamide,
   (b) an aqueous solution containing a proportion of an activator of said redox polymerization catalyst system of the group consisting of sodium bisulfite, sodium formaldehyde sulfoxylate, and sodium metabisulfite sufficient to activate polymerization of the vinyl acetate and acrylamide by the initiator, and a proportion of a stable buffer salt sufficient to maintain the pH of the polymerization mixture in the range from 5 to 7, the rate of addition of the vinyl acetate solution of acrylamide being regulated to sustain copolymerization and maintain temperature of the polymerization mixture at least 10° C. below the reflux temperature thereof, the rate of addition of the buffer solution being proportioned to that of the vinyl acetate so that the additions are completed in substantially the same time, and the combined amounts of vinyl acetate and acrylamide used being between 50% and 70% by weight of the resulting emulsion, and (3) continuing agitation of the polymerization mixture until copolymerization of the monomers is complete, then cooling the emulsion to ambient temperature.

The foregoing particular embodiment of the invention is a batch process suitable, for example, for preparing the emulsion product disclosed in previously mentioned U.S. Pat. 3,365,409. The invention can also be adapted to continuous emulsion polymerization processes. Thus in another embodiment the invention consists in a process for preparing an aqueous emulsion of a random copolymer of vinyl acetate and acrylamide, said acrylamide amounting to from 2 to 15% by weight of the vinyl acetate, which process comprises:

(i) dissolving the acrylamide to be copolymerized in a mixture of the vinyl acetate to be copolymerized and a solubilizing agent which is effective to make the vinyl acetate solvent for the acrylamide to form a solution of monomers, (ii) continuously dispersing a portion of said solution into an aqueous medium together with polymerization initiator and from 0 to 1%, by weight of the vinyl acetate, of emulsifying agent to form a polymerization mixture in a polymerization zone whose temperature is controlled to maintain it in a polymerization range, and (iii) maintaining the polymerization mixture under continuous agitation in the polymerization zone as copolymerization of the monomers proceeds, and (iv) continuously withdrawing a portion of said polymerization mixture from said polymerization zone as a stable aqueous emulsion of vinyl acetate acrylamide copolymer.

The solubilizing agent effective to make vinyl acetate a solvent for acrylamide can be any one of numerous materials which can readily be ascertained to cause acrylamide to dissolve in vinyl acetate without reacting or otherwise adversely affecting the subsequent polymerization reaction. Preferably also the solubilizing agent used is one whose presence in the resulting polymer emulsion is innocuous, thereby precluding any need to remove it from the final emulsion product. If its presence in the emulsion product is not wanted the solubilizing agent should then preferably be one which can be readily removed from the emulsion product. Examples of materials which are particularly suitable as solubilizing agents for this invention are the lower monohydric alcohols, especially methanol whose presence in an emulsion is generally innocuous and which also is quite easily removed from a polymer emulsion, e.g. by steam stripping. Similarly ethanol, isopropanol, tertiary butanol and also formamide cause acrylamide to dissolve in vinyl acetate to an extent suitable for purposes of the present invention. Other examples of materials suitable as solubilizing agents for acrylamide in vinyl acetate, but somewhat less preferred for this invention are diemthyl formamide, dimethyl acetamide, dimethyl sulfoxide, and similar solvents for acrylamide, providing they are selected so as to avoid interference with the polymerization reaction.

The proportion of solubilizing agent used in the present invention will generally be as small as possible, usually just the proportion required to cause the acrylamide to dissolve in the vinyl acetate, although a slight excess can be advantageous to expedite dissolution of the acrylamide. The proportion of solubilizing agent thus generally will be only a small percentage of the amount of vinyl acetate. For example, a proportion of methanol of 4% based on the weight of the vinyl acetate is sufficient to enable the vinyl acetate to dissolve over 6% of its weight of acrylamide monomer. A proportion of 5% to 8% of methanol, by weight of the vinyl acetate, is preferred to ensure rapid solution of the acrylamide, and is sufficient to ensure solubility in vinyl acetate of the acrylamide monomer used in this invention. It is to be noted that the mixture of vinyl acetate with these proportions of methanol is not a solvent for the homopolymer of acrylamide. As additional examples of proportions, isopropanol to the extent of at least 6% to 8% by weight of vinyl acetate is required to render the vinyl acetate solvent for the acrylamide for purposes of this invention, and tertiary butanol to the extent of at least 7% to 9% to achieve the same purpose. The foregoing proportions are proportions providing the indicated solubility at ambient room temperature (between 20 and 25° C.). Proportions of formamide sufficient for purposes of this invention are generally even smaller than the proportions of methanol which have been indicated above.

When another monomer is interpolymerized with the vinyl acetate and acrylamide, the additional monomer is suitably dissolved in the vinyl acetate to which is added the acrylamide solubilizing agent and the acrylamide monomer. The suitable proportions of solubilizing agent required are generally as indicated hereinbefore and are appropriately expressed as a percentage by weight of total monomers other than acrylamide rather than as a percentage of vinyl acetate used. Alternatively, of course, the additional monomer can be added as a separate feed to the polymerization reaction but this is less preferred from the point of view of practical operation. The interpolymerization can also be carried out as a batch or continuous operation which in all respects, other than the inclusion of additional monomers, is carried out in the manner hereinbefore described.

The invention is more specifically disclosed by the following examples which are only illustrative thereof and not limiting to the scope of the invention.

Example 1

Into 407 gm. vinyl acetate (438 ml.) in a flask, 24 ml. methanol were added as solubilizing agent then 33 gm. acrylamide were dissolved therein, forming a solution containing some haze due to the presence of some polymer of acrylamide. The hazy material was filtered through a No. 1 Whatman filter paper and emerged as a clear solution. To the clear solution was added 2.0 ml. 70% tertiary butyl hydroperoxide solution. Into a four-neck one litre polymerization flask equipped with a stirrer and reflux condenser was charged 200 ml. water under a blanket of nitrogen; temperature of the charge was adjusted to 40° C. Into 150 ml. water was dissolved 2.0 gm. sodium bisulfite (meta), ($Na_2S_2O_5$), and 2.0 gm. disodium hydrogen prosphate ($Na_2HPO_4$) to form an aqueous buffering solution containing an ingredient of the polymerization initiator system. With cooling to maintain the temperature of the polymerizing mixture at 40±2° C., the vinyl acetate solution of acrylamide and tertiary butyl hydroperoxide and the aqueous solution of $Na_2S_2O_5$ and $Na_2HPO_4$ were metered simultaneously into the polymerization flask at uniform rates with continuous stirring to achieve completion of the additions in about two hours. Polymerization proceeded as the solutions were added, and for 30 minutes after completion of the additions the temperature was maintained at 40° C., then the resultant copolymer emulsion was cooled to room temperature and a sample thereof analyzed immediately for residual vinyl acetate content; it was found to contain 0.15% by weight vinyl acetate monomer.

A sample of emulsion prepared as aforesaid was warmed to 80° C. in the polymerization flask while a stream of air was bubbled into the sample and vented through the condenser which was turned to prevent refluxing of condensibles back into the polymerization flask. The airstream stripped methanol and some water from the emulsion, the water and methanol being condensed and collected, then identified by analysis. The residual emulsion was a smooth creamy stable dispersion of vinyl acetate-acrylamide copolymer having a solids content of 54.8% wt./wt., a pH of 5.6, and a viscosity of 9.0 poises measured at 24° C. on a Brookfield viscometer using No. 3 spindle turning at 20 r.p.m.; the number average particle size of the copolymer particles in the emulsion was 0.225 microns and the copolymer contained 8.1% acrylamide by weight of the vinyl acetate therein and was completely soluble in a 75/25 wt./wt. mixture of acetone/water as described in the "Solubility Test" disclosed in aforementioned U.S. Pat. 3,365,409. The small proportion of methanol in the copolymer emulsion prepared as described above, before air-stripping the methanol therefrom, had no observable significant effect on the properties of the emulsion.

Example 2

The procedure of Example 1 was repeated but using only 20 ml. methanol in lieu of the 24 ml. used in Example 1 and using tetramethyl butyl hydroperoxide in place of the tertiary butyl hydroperoxide. The small proportion of methanol in the composition on completion of the polymerization was insignificant and was allowed to remain therein. The product emulsion of vinyl acetate-acrylamide copolymer had a pH of 3.3, a viscosity measured as above of 5.9 poises, a solids content of 52.1% and a surface tension of 47.0 dynes/cm.

Example 3

A quantity of 33 gm. acrylamide, 407 gm. vinyl acetate and 30 ml. (23.5 gm.) isopropanol was mixed in a flask and gently warmed by swirling in a stream of hot water from a tap to dissolve the acrylamide. On cooling the solution to filter it, acrylamide crystallized therefrom and an additional 20 ml. (15.6 gm.) isopropanol was required to keep the acrylamide dissolved in the vinyl acetate at room temperature. The procedure of Example 1 was then followed using 175 ml. water initially in the polymerization flask and adding the foregoing solution of acrylamide in vinyl acetate-isopropanol in place of the vinyl acetate-methanol solution of Example 1. Copolymerization of the monomers required seven to eight minutes to start on addition to the polymerization flask and proceeded less vigorously than in the preceding examples for half an hour, but continued normally thereafter to completion of the reaction. The product was a stable creamy aqueous emulsion of vinyl acetate monomer content, a viscosity of 8.7 poises measured as previously described, a pH of 5.55, and a surface tension of 42.2 dyne/cm. The surface tension thus was expectedly lower than that of comparable emulsions made by the prior art process without the use of isopropanol solubilizing agent; such emulsions generally have a surface tension of about 48.7 dynes/cm.

Example 4

A quantity of 33 gm. acrylamide was dissolved in 407 gm. vinyl acetate by admixing tertiary butanol therewith, requiring 55 ml. (42.8 gm.) of the alcohol to maintain the acrylamide in solution at room temperature. The monomer solution was then added to an initial charge of 165 ml. water and polymerized following the procedure of Example 1. As in Example 3 with isopropanol, the polymerization initially was slow but after one half hour accelerated and proceeded normally to produce a smooth creamy stable copolymer emulsion product. The emulsion had a solids content of 55.4%, a pH of 5.45, a residual vinyl acetate content of 0.035% and a viscosity of 55 poises measured at 25° C. with a Brookfield viscometer using No. 5 spindle. The higher viscosity of the emulsion, compared to those of the previous examples, indicated that the tertiary butanol was not without effect on the emulsion polymerization, but the product was nevertheless suitable in all respects as a coating and adhesive base emulsion.

Example 5

This example illustrates an embodiment of the invention in which a continuous polymerization process is used to prepare a copolymer emulsion. The process was carried out in a continuous polymerization apparatus which included a centrifugal type circulating pump arranged to circulate polymerizing mixture through a substantially closed loop circuit in indirect heat exchange relationship with a suitable cooling medium. The pump was driven at 1755 r.p.m. and was rated to deliver 92.5 imperial gallons of water per minute at a discharge pressure of 20 p.s.i. (419 liters/min. at 1.4 kg./cm.² pressure). The loop circuit consisted essentially of 40 feet (12.2 meters) of two inch (5 cm.) nominal diameter stainless steel tubing, coiled for convenience and immersed under a water spray which was varied to regulate the temperature of the coiled tubing. Ingredients for the copolymer emulsion were fed continuously at uniform rates to the inlet of the pump for circulation with the polymerizing mixture through the loop which returned most of the mixture to the inlet of the pump; a small proportion of the flow in the loop was continuously withdrawn therefrom at a point near the return to the pump inlet, the polymerizing mixture in the loop near the pump inlet being nearly completely polymerized. The weight rate of continuous withdrawal from the loop was equal to the weight rate of continuous feed of ingredients, thus maintaining a constant volume of polymerizing mixture circulating in the loop. The relative rates of flow of polymerizing mixture in the loop and of continuous withdrawal were estimated roughly to be in the range from about 50:1 to about 100:1. The volume of polymerizing mixture in the pump and loop at any instant during polymerization was about 5.5 imperial gallons (25 liters), and the total rate of feed of ingredients 26 imperial gallons (118 liters) per hour, thus the hold-up time or average residence time of the reacting mixture in the polymerization apparatus was about 12.7 minutes. Two feed solutions were prepared as follows:

(1) Acrylamide was dissolved in a mixture of methanol and vinyl acetate, together with a small proportion of tert-butyl hydroperoxide (70% active ingredient) to give a monomer solution of 87.76% vinyl acetate, 4.71% methanol, 7.12% acrylamide, and 0.41% tertiary butyl hydroperoxide;

(2) Sodium bisulfite and disodium hydrogen phosphate were dissolved in water to give an aqueous buffer solution of 0.54% NaHSO$_3$, 0.54% Na$_2$HPO$_4$ and 98.92% water. The polymerization apparatus was initially filled with water, the circulating pump was started to circulate the emulsion through the loop, then uniform rate feed of the monomer and aqueous buffer solutions at 15 and 11 imperial gallons per hour (68.2 and 50 liters per hour) respectively to the inlet of the circulating pump was started using two metering pumps to feed these solutions to the circulating pump. When feed of the monomer and buffer solutions was started the temperature of the emulsion circulating in the loop began to rise from ambient room temperature and was allowed to rise to 40° C. at which value it was maintained by regulation of the cooling water spray on the loop. The product emulsion withdrawn from the loop was accumulated in a storage vessel and periodically samples of the emulsion coming from the loop were taken for determination of the emulsion properties. Under the steady state conditions of reactant feed, polymerization, and product withdrawal which were rapidly achieved, the product emulsion was found to be a stable copolymer emulsion containing 54.8% total solids by weight of the emulsion; it had a pH of 5.6, a viscosity of 3.7 poises at 20° C., and a residual vinyl acetate monomer content, immediately after withdrawal from the loop, of slightly less than 0.3% by weight of the emulsion. The residual vinyl acetate content of the emulsion decreased on standing one day to 0.14%, indicating the continuance of polymerization at least to some extent after withdrawal of the emulsion from the loop. The copolymer in the emulsion was found to be a random vinyl acetate-acrylamide copolymer, completely soluble in a 3:1 w./w. acetone-water mixture, and to contain 7.5% of acrylamide by weight of the copolymer.

Example 6

Into 407 gm. vinyl acetate in a flask were added 15 gm. formamide as solubilizing agent then 33 gm. acrylamide was dissolved therein and the resulting hazy solution filtered to obtain a clear solution. To this solution was added 2 ml. 70% tertiary butyl hydroperoxide solution to form the monomer feed solution. Into 140 ml. water were dissolved 2 gm. sodium bisulfite (meta), and 2 gm. disodium hydrogen phosphate to form an initiator solution. The monomer feed solution and initiator solution were fed simultaneously into an initial charge of 210 ml. water in the polymerization flask described in Example 1, and the copolymerization carried out at 40° C. as described in the aforesaid example. The copolymerization proceeded smoothly to completion within two hours to produce a smooth creamy emulsion of vinyl acetate acrylamide copolymer similar to that produced in Example 1. The product emulsion had a solids content of 54.1%, a pH of 5.7, a residual vinyl acetate content of 0.055%, a viscosity of 2.6 poises at 23° C. measured with a Brookfield viscometer using No. 3 spindle at 20 r.p.m., and a surface tension of 49.5 dynes/cm. The vinyl acetate acrylamide copolymer in the emulsion was completely soluble in a 25/75 wt./wt. mixture of water/acetone. Because of its higher boiling point, the formamide remaining in the emulsion could not readily be removed therefrom, but its presence was considered innocuous or even beneficial to the extent that it could act as a plasticizer for the copolymer.

Example 7

In 326 grams of vinyl acetate were dissolved 81 grams of n-butyl acrylate and 15 grams of formamide. To this solution was then added a quantity of 33 grams of acrylamide which dissolved therein to form a solution containing some haze which was removed by filtration through Whatman No. 1 filter paper. To the resulting clear solution was added 2.0 ml. of 70% tertiary butyl hydroperoxide solution. The procedure of Example 1 was then followed using 210 grams of water containing dissolved therein 1 gram of hydroxyethyl cellulose, sold as Natrosol 250 HR (trademark), and 2 grams of Pluronic L–64 (trademark), a polyethylene-polyoxypropylene copolymer emulsifier of approximate molecular weight 2900 containing about 40% by weight of polyoxyethylene groups, as the inital charge in the polymerization flask and adding the foregoing vinyl acetate-butyl acrylate-formamide-acrylamide solution in place of the vinyl acetate methanol-acrylamide solution of Example 1. The aqueous buffer solution containing the reducing agent of the redox initiator consisted of 140 grams of water containing dissolved therein 2 grams of sodium metabisulfite and 2 grams of disodium hydrogen phosphate.

The product was a very stable creamy aqueous emulsion of a vinyl acetate-butyl acrylate-acrylamide terpolymer having 0.25% residual monomer by weight of emulsion, 53.5% total solids by weight of emulsion, a viscosity of 14.3 poises measured as previously described, a pH of 6.2 and an average particle size of 0.39 micron. The terpolymer in the emulsion was a random terpolymer containing 24.9% butyl acrylate by weight of vinyl acetate and 8.1% acrylamide by weight of vinyl acetate and butyl acrylate in the terpolymer, and was completely soluble in a 25/75 wt./wt. mixture of water/acetone. This emulsion showed outstanding properties for adhesive applications, particularly with added external plasticizer for use in laminating self-supporting polymer films to wood substrates.

Numerous variations can be made in the various expedients described without departing from the scope of the invention. For example, various redox initiator systems can be used to initiate polymerization, as is known in the art, particularly that disclosed in the previously mentioned U.S. Pat. 3,365,409. Examples of suitable organic hydroperoxides for such redox initiator systems are cumene hydroperoxide, diisopropylbenzene hydroperoxide, transdecalin hydroperoxide, tetralin hydroperoxide, paramenthene hydroperoxide, 1,1,3,3-tetramethylbutyl hydroperoxide, and tertiary butyl hydroperoxide; examples of suitable activators (reductants) for such redox initiator systems are sodium bisulfite, sodium metabisulfite, and sodium formaldehyde sulfoxylate. Likewise, various polymerization temperatures can be used, depending on the particular method of operation used. Thus batch operations in which monomer is gradually added to an accumulating charge of polymerizing material are preferably carried out at temperature about 10° C. or more below the reflux temperature to avoid formation of grits in the emulsion product. However, continuous polymerization operation such as shown in Example 5, with no large accumulation of polymerizing monomer, is not as subject to formation of grits and can be carried out at other convenient polymerization temperatures. Furthermore, wetting agents i.e. emulsifying agents in the aqueous polymerizing medium are optional. Likewise additional ingredients can be added to the emulsions prepared by the process of this invention once the polymerization has been completed. Thus for example plasticizers, thickeners, and/or suitable cross-linking agents can be added to modify the properties of the polymer emulsions to make them more suitable for specific purposes or uses. Particularly convenient and appropriate for the polymer emulsions made by the process of this invention is the adjustment of the viscosity of the emulsions to higher values by addition thereto of small proportions of thickening agents, for example finely divided silica sold under the name "Cab-O-Sil" (trademark) or higher molecular weight water soluble acrylamide vinyl acetate copolymer. Proportions of such thickening agents as small as 1% by weight of the emulsion are effective to increase the viscosity of the emulsion, e.g. from the range around 5–8 poises to the range around 45–55 poises without significantly affecting other properties of the emulsion.

What is claimed is:

1. In a process for preparing an aqueous emulsion of a random interpolymer from monomers comprising vinyl acetate and acrylamide, said interpolymer containing a major proportion of vinyl acetate, and from 2% to 15% of acrylamide by weight of monomers other than acrylamide, by emulsion polymerization of the monomers in aqueous medium in proportions to provide an interpolymer emulsion of from 50% to 70% solids, the improvement which comprises dissolving the acrylamide monomer in a mixture of the vinyl acetate monomer and a solubilizing agent from the group consisting of methanol, ethanol, isopropanol, tetiary butanol, formamide, dimethyl formamide, dimethyl acetamide, and dimethyl sulfoxide which is effective to make the vinyl acetate a solvent for the acrylamide, dispersing the monomers into an aqueous polymerization medium and interpolymerizing the monomers therein to form an aqueous interpolymer emulsion.

2. The improvement in a process as claimed in claim 1 wherein the process is the preparation of an aqueous emulsion of a random copolymer from monomers consisting essentially of vinyl acetate and acrylamide.

3. The improvement in the process for preparing an aqueous emulsion of a random copolymer of vinyl acetate and acrylamide as claimed in claim 2, in which the process is carried out by:
    (1) establishing an initial aqueous polymerization medium containing:
        (a) a major proportion of the water for the aqueous emulsion being prepared,
        (b) a proportion from 0% to 25% of the total amount of acrylamide to be copolymerized, said total amount being from 2% to 15% by weight of the vinyl acetate to be copolymerized, said proportion of acrylamide being dissolved in
        (c) a part amounting to less than 10% of the total amount of vinyl acetate to be copolymerized, said vinyl acetate containing dissolved therein a proportion of an organic hydroperoxide initiator of a redox polymerization catalyst system and a solubilizing agent effective to make the vinyl acetate a solvent for the acrylamide, and
        (d) an amount, from 0% to 1% by weight of the vinyl acetate to be polymerized, of an emulsifying agent effective to emulsify the vinyl acetate in the aqueous medium,
    (2) while maintaining the aqueous polymerization medium continuously agitated and at a temperature at least 10° C. below the reflux temperature thereof, and preferably in the range of 40–45° C., slowly adding to the aqueous medium to form a polymerization mixture:
        (a) the remainder of the vinyl acetate to be copolymerized, said vinyl acetate containing:
            (i) an additional proportion of said organic hydroperoxide initiator,
            (ii) the remainder of the acrylamide to be copolymerized, and
            (iii) a solubilizing agent effective to make the vinyl acetate a solvent for the said remainder of the acrylamide.
        (b) an aqueous solution containing a proportion of an activator of said redox polymerization catalyst system of the group consisting of sodium bisulfite, sodium formaldehyde sulfoxylate, and sodium metabisulfite sufficient to activate polymerization of the vinyl acetate and acrylamide by the initiator, and a proportion of a stable buffer salt sufficient to maintain the pH of the polymerization mixture in the range from 5 to 7,
    the rate of addition of the vinyl acetate solution of acrylamide being regulated to sustain copolymerization and maintain temperature of the polymerization mixture at least 10° C. below the reflux temperature thereof, the rate of addition of the buffer solution being proportioned to that of the vinyl acetate so that the additions are completed in substantially the same time, and the combined amounts of vinyl acetate and acrylamide used being between 50% and 70% by weight of the resulting emulsion, and
    (3) continuing agitation of the polymerization mixture until copolymerization of the monomers is complete, then cooling the emulsion to ambient temperature.

4. The improvement in the process for preparing an aqueous emulsion of a random copolymer of vinyl acetate and acrylamide as claimed in claim 2, in which the process is carried out by
    (i) dissolving the acrylamide to be copolymerized in a mixture of the vinyl acetate to be copolymerized and a solubilizing agent which is effective to make the vinyl acetate solvent for the acrylamide to form a solution of monomers,
    (ii) continuously dispersing a portion of said solution into an aqueous medium together with polymerization initiator and from 0 to 1%, by weight of the vinyl acetate, of emulsifying agent to form a polymerization mixture in a polymerization zone whose temperature is controlled to maintain it in a polymerization range, and
    (iii) maintaining the polymerization mixture under continuous agitation in the polymerization zone as copolymerization of the monomers proceeds, and
    (iv) continuously withdrawing a portion of said polymerization mixture from said polymerization zone as a stable aqueous emulsion of vinyl acetate acrylamide copolymer.

5. The improvement in a process as claimed in claim 4 in which the solubilizing agent is methanol in a proportion from 4% to 8% by weight of the vinyl acetate.

6. The improvement in a process as claimed in claim 4 in which the solubilizing agent is methanol in a proportion from 4% to 8% by weight of the vinyl acetate.

7. The improvement in a process as claimed in claim 3 in which the organic hydroperoxide initiator is tertiary butyl hydroperoxide, cumene hydroperoxide, diisopropylbenzene hydroperoxide or tetralin hydroperoxide.

8. The improvement in a process as claimed in claim 1 wherein an additional ethylenically unsaturated monomer selected from the group consisting of alkyl esters of acrylic acid, alkylmaleates, alkylfumarates, vinylpropionate, vinylbutyrate and vinyldecanoate is interpolymerized with vinylacetate and acrylamide.

9. The improvement in a process as claimed in claim 8 wherein the additional monomer is also dissolved in the vinyl acetate monomer prior to polymerization.

10. The improvement in a process as claimed in claim 9 wherein the additional monomer is n-butyl acrylate.

11. The improvement in a process as claimed in claim 10 wherein the solubilizing agent is formamide.

References Cited

UNITED STATES PATENTS

| | | | |
|---|---|---|---|
| 2,782,173 | 2/1957 | Bristol et al. | 260—85.7(X) |
| 2,886,557 | 5/1959 | Talet | 260—85.7(X) |
| 3,080,350 | 3/1963 | Imai et al. | 260—30.8OMSO |
| 3,194,726 | 7/1965 | Baxendale | 260—32.6N(X) |
| 3,203,817 | 8/1965 | Phelisse et al. | 260—30.8OMSO(X) |
| 3,365,409 | 1/1968 | Lanthier | 260—29.6HN |
| 3,409,578 | 11/1968 | Hwa | 260—29.6TA |
| 3,412,060 | 11/1968 | Sarem | 260—30.8OMSO |

JULIUS FROME, Primary Examiner

J. B. LOWE, Assistant Examiner

U.S. Cl. X.R.

260—30.8, 32.6, 85.7

UNITED STATES PATENT OFFICE
CERTIFICATE OF CORRECTION

Patent No. 3,577,385    Dated May 4, 1971

Inventor(s) Joseph Feltzin and Nadji Y. Tehrani

It is certified that error appears in the above-identified patent and that said Letters Patent are hereby corrected as shown below:

Column 7, line 17, in the table five (5) columns over from Example 11 reads "298" it should read --208--. Column 7, line 22, in the table three (3) columns over from Example 16 reads "9,590" it should read --9500--.

Signed and sealed this 7th day of December 1971.

(SEAL)
Attest:

EDWARD M. FLETCHER, JR.          ROBERT GOTTSCHALK
Attesting Officer                Acting Commissioner of Patents